United States Patent [19]
Pischel

[11] Patent Number: 5,590,499
[45] Date of Patent: Jan. 7, 1997

[54] PROCESS AND ARRANGEMENT FOR MANUFACTURING A PREFABRICATED, INSULATING WALL ELEMENT

[76] Inventor: Dieter A. Pischel, Lottbekheide 17, 22395 Hamburg, Germany

[21] Appl. No.: 150,164

[22] PCT Filed: May 28, 1992

[86] PCT No.: PCT/DE92/00434

§ 371 Date: Apr. 18, 1994

§ 102(e) Date: Apr. 18, 1994

[87] PCT Pub. No.: WO92/21512

PCT Pub. Date: Dec. 10, 1992

[30] Foreign Application Priority Data

May 31, 1991 [DE] Germany ............... 41 17 820.3

[51] Int. Cl.$^6$ ............... E04C 2/10; B29C 33/00
[52] U.S. Cl. ............... 52/309.9; 264/46.5; 264/277; 425/89; 249/114.1; 249/115; 249/170; 249/83; 249/85; 249/155
[58] Field of Search ............... 52/309.4, 309.8, 52/309.14, 314, 315, 309.9; 264/46.5, 277; 425/89; 249/114.1, 115, 170, 83, 85, 155

[56] References Cited

U.S. PATENT DOCUMENTS

| | | | |
|---|---|---|---|
| 3,304,673 | 2/1967 | Ramoneda | 52/314 X |
| 3,426,490 | 2/1969 | Taylor | 52/314 X |
| 3,496,694 | 2/1970 | Hicks et al. | 52/314 X |
| 3,552,711 | 1/1971 | Delaney | 249/170 |
| 3,602,476 | 8/1971 | Iragorri . | |
| 3,646,715 | 3/1972 | Pope | 52/309.9 |
| 3,775,916 | 12/1973 | Bair | 52/315 X |
| 4,224,773 | 9/1980 | Schwörer | 52/315 |
| 4,765,938 | 8/1988 | Schmidt et al. | 249/83 X |
| 4,923,539 | 5/1990 | Spengler et al. | 264/46.5 X |
| 5,061,161 | 9/1991 | Tetu | 264/46.5 |
| 5,281,047 | 1/1994 | Skaug | 52/315 X |

FOREIGN PATENT DOCUMENTS

| | | |
|---|---|---|
| 0345244 | 8/1989 | European Pat. Off. . |
| 0401051 | 3/1990 | European Pat. Off. . |
| 170018 | 8/1905 | Germany . |
| 294020 | 12/1914 | Germany . |
| 1949392 | 10/1966 | Germany . |
| 1804248 | 7/1970 | Germany . |
| 2514273 | 1/1976 | Germany . |
| 82019495 | 3/1982 | Germany . |
| 3045836 | 4/1982 | Germany . |
| 1202701 | 9/1966 | United Kingdom . |

OTHER PUBLICATIONS

Hanleys Condensed Chemical Dictionary Eleventh Edition p. 404.
Société Céramique de La Lys, "Panogil" Bulletin des Avis Techniques Mar. 1991.

*Primary Examiner*—Wynn E. Wood
*Attorney, Agent, or Firm*—Thomas M. Freiburger

[57] ABSTRACT

A process is disclosed for manufacturing an angular insulating wall element consisting of an angular rigid foam plate linked to brick fillets. Angular, one-piece fillets are space apart in a lying mold having an essentially V-shaped cross-section and the spacings between the fillets are filled with a mixture of san and isocyanate. Between the backs of the fillets and the sand and isocyanate mixture on the one hand and a countermold on the other hand is introduced a rigid foam layer, whereas part of the rigid foam partially impregnates the sand and isocyanate mixture. The areas of the mixture that are not impregnated with rigid foam are removed after curing the rigid foam layer. A molding box for carrying out this process is also disclosed.

11 Claims, 4 Drawing Sheets

PROCESS AND ARRANGEMENT FOR MANUFACTURING A PREFABRICATED, INSULATING WALL ELEMENT

The invention relates to a process for producing a prefabricated, insulating, angular wall element consisting of an angular rigid foam panel with brick fillets which are bonded thereto and separated from one another by a mortar-like composition, a device for carrying out a process of this kind clause of Claim 7 and an insulating, angular wall element consisting of angular brick fillets bonded by means of an angular rigid foam panel and separate from one another.

For insulating buildings it is known to apply onto the exterior side-of the wall prefabricated facing panels which are formed as composite panels from a rigid polyurethane foam and brick fillets. The individual fillets are separated from one another by mortar joints. In this manner a building wall can be completely insulated retrospectively, the building wall having the appearance of a masonry wall.

Facing panels of this kind are known from German Utility Model 82 01 949.5. For the production of these elements, fillets are arranged at a clearance from one another in a mold and the joints formed are filled with a mixture of sand. Subsequently the mold is foamed with polyurethane foam, the foam, on account of its distribution, penetrating even into the joints between the fillets and consolidating the joints on curing.

Although the process can be used advantageously for flat wall regions, problems occur at building edges, window and door openings, that is to say at all regions of the building at which edge regions are at an angle to one another. In these regions it is therefore normally necessary to provide the abutting wall elements with mitre edges and adhesively bond them together. If angle joints of this kind are not formed with close tolerances, shoulders result which both spoil the optical appearance and are subject to damage.

The invention is therefore based on the object of specifying a process for producing a prefabricated, insulating, angular wall element by means of which a retrospective adhesive-bonding of panel-shaped wall elements can be avoided, the production time of the angular wall element can be kept very small and, in addition, the erection time for insulating a building is significantly reduced. The invention is further based on the object of specifying a device for carrying out a process of this kind and a wall element produced according to this process.

According to the process according to the invention, angular, one-part fillets, which are known per se, are laid adjacent to one another with a clearance in a horizontal mold with an essentially V-shaped cross-section. The interspaces between the fillets are filled with a mixture of sand and isocyanate. Between the reverse surfaces of the fillets and the sand/isocyanate mixture and a countermold, polyurethane foam is introduced, a part of the polyurethane penetrating into the sand/isocyanate mixture before the polyurethane introduced finally cures.

A device according to the invention for carrying out the process has two mold parts which can be assembled with brick-shaped recesses to receive angular fillets in order to form a trough-shaped mold and onto which a countermold can be placed with the formation of a clearance.

Finally, a wall element in a preferred embodiment of the invention, produced according to the process according to the invention with the device according to the invention, consists of an angular rigid foam panel with angular brick fillets which are bonded thereto, laid in a sand/polyurethane mixture and in which the rigid foam material preferably additionally permeates the sand/isocyanate mixture.

The invention makes possible the production of an angular wall element which can be used in particular as a corner part of buildings to be insulated. It can also readily be used as a composite with flat panels produced in a similar manner. The invention has the advantage that wall elements of this kind can be brought already prefabricated onto the construction site without an in situ adhesion bonding of flat wall elements being necessary there. The mitre connection of two flat elements, which would require a high outlay on the construction site, is also not necessary.

The invention is explained below with reference to an exemplary embodiment.

Figure 1:
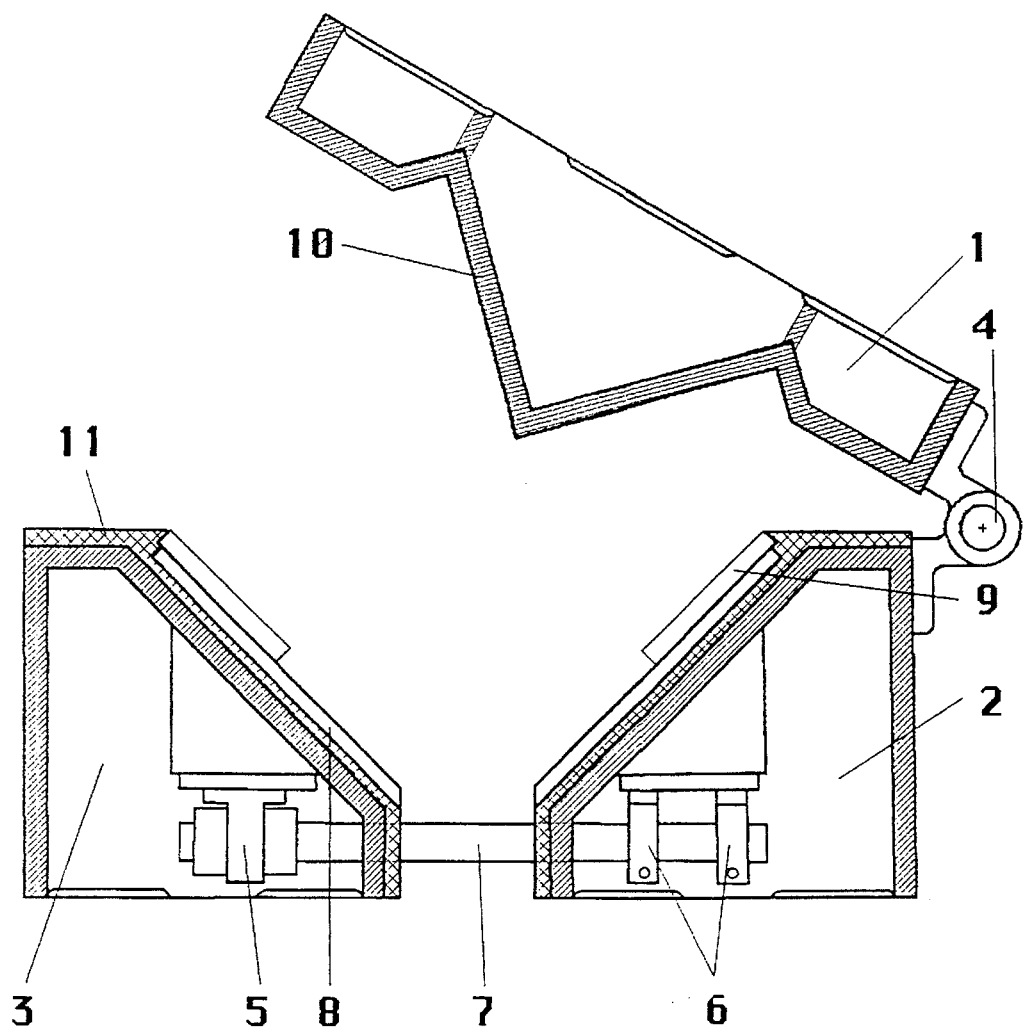
FIG. 1 shows a swung-open view of a mold for producing angular wall elements.

The mold shown in FIG. 1 has two lower mold parts 2 and 3 which contain, on their underside, support blocks 5 and 6 which are connected to one another by a slide rod 7. The mold parts 2 and 3 can therefore be brought together or separated by means of the slide rod 7. A cover 1 having a countermold 10 is articulated on one of the mold parts via a hinge 4.

The process according to the invention is carried out as follows:

First of all, angular fillets, for example 11 in number, are laid adjacent to one another with alternating orientation into the mold parts 2 and 3. These have on their mold surface slightly raised webs 12 and elevations 9. The webs 12 form the joint regions of the subsequent wall element. The elevations 9 form, in the subsequent wall element, recesses into which further fillets for bonding the wall element produced to adjacent wall elements can be inserted. After the fillets have been inserted into the mold parts 2 and 3, the latter are pushed towards one another via the slide rods 7. This can be carried out manually; however the operation can also take place hydropneumatically or by a worm drive. If a single slide rod is used, the closing of the mold parts 2 and 3 preferably takes place via toggle-lever devices attached on the end face of the mold.

According to the invention it is provided for the sand/isocyanate mixture to be introduced between the fillets to form the joint regions. This mixture is preferably produced from 30–80 parts of washed sand with a grain size of G2 or G3 and one liter of isocyanate, until the mixture has a pasty consistency. The mixture is then incorporated into the interspaces between the fillets, in particular using a trowel, so that an eventually smooth surface, consisting of fillet reverse side, elevations 9 and sand/isocyanate mixture, results. Isocyanate has the property of binding residual moisture in the sand and thus stabilizing the mixture. At the same time the isocyanate introduced serves as a curing agent for polyurethane which is subsequently applied to the reverse side thus formed. If the sand were not mixed according to the invention with isocyanate, the sand would not stay in the joint regions but trickle out, because of the angular arrangement.

Figure 2:
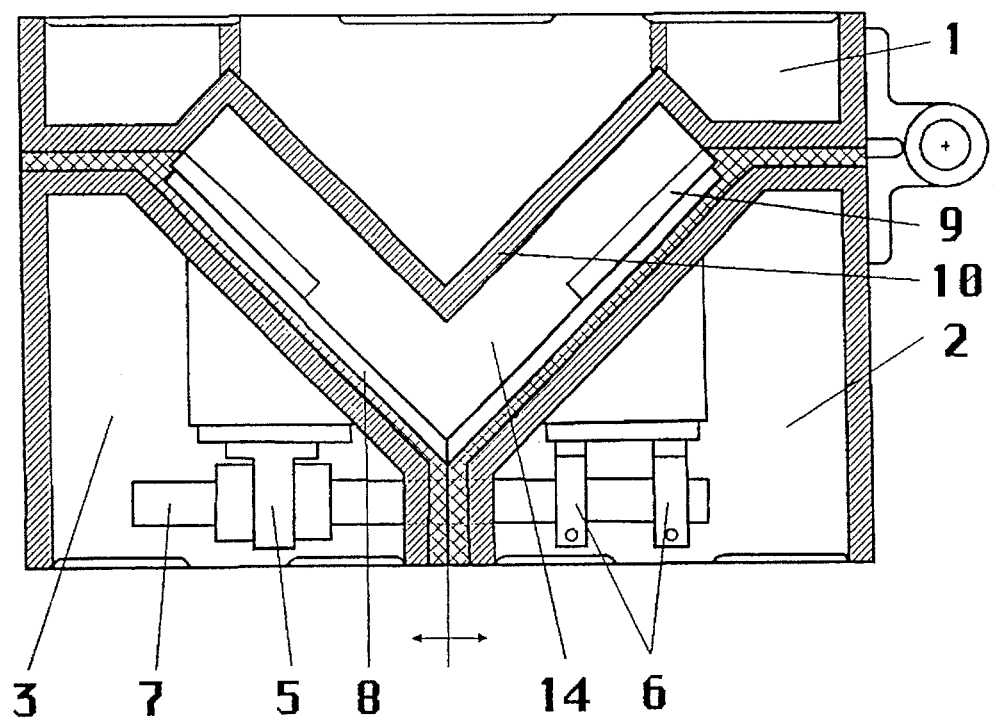
FIG. 2 shows a closed view of a corresponding mold.

After the sand/isocyanate mixture is introduced into the mold, a paper layer is stretched across the countermold 10. Then the cover 1 is swung down and locked, preferably by means of toggle-lever connections, to the lower mold parts. FIG. 2 shows a correspondingly closed mold. Two-component polyurethane can then be introduced into the interspace 14 from the side, for example through an end hole. This material foams directly and thereby fills the entire space between the fillets, sand/isocyanate mixture and elevations 9 and also the countermold 10. During the initiation time of the polyurethane foam, a part of this material penetrates into the sand/isocyanate mixture to a desired depth which depends on various factors. The polyurethane to be introduced should be formulated to this end such that, after the final curing of the polyurethane foam, no penetration through the sand/isocyanate mixture has occurred. A preferred polyurethane mixture consists of 100–130 parts of polyol and 100 parts of isocyanate.

Preferably the brick fillets laid into the mold are preheated, in particular to a temperature of 40°–50° C. The foaming behaviour of the polyurethane is thus improved and the penetration depth of the polyurethane into the sand/isocyanate mixture can be better controlled. Insofar as a heating of the entire mold to 70°–80° takes place, for example by heating coils in the lower mold regions 2 and 3 or by electrical heating spirals, the quantity of CFC blowing agents in the polyurethane foam to be introduced can be considerably reduced.

Figure 3:
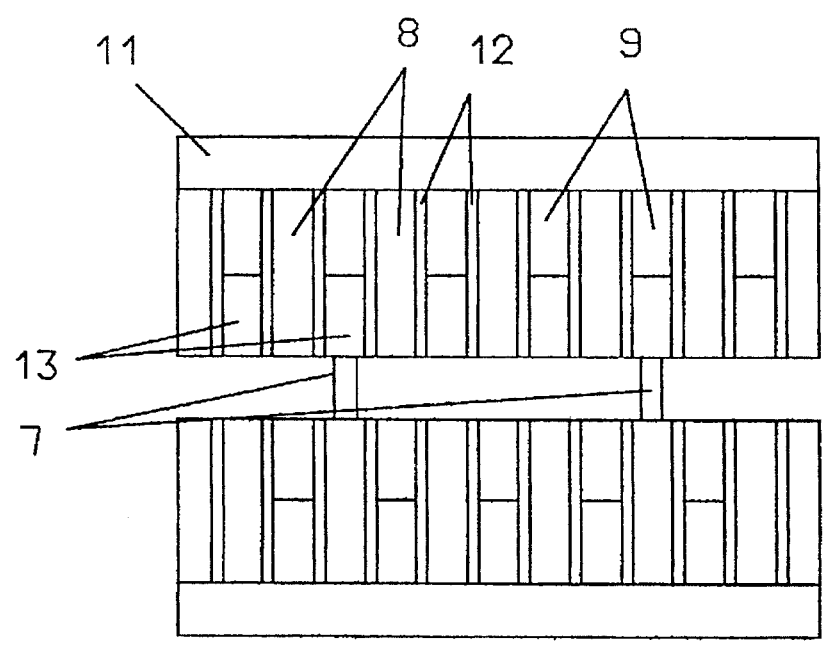
FIG. 3 shows a view of the lower part of the mold.

FIG. 3 shows a view of the lower mold parts 2 and 3. It can be clearly seen that the depressions 8 and 13 serve to receive alternately oriented fillets. The webs 12 serve primarily to fix the joint regions. The sand/isocyanate mixture is introduced into these regions. The elevations 9 must have such a height that they form an approximate plane with the reverse side of fillets when the latter have been laid into the mold. So that the polyurethane foam to be introduced does not adhere to the elevations 9, the latter are previously provided with a release agent, in particular based on wax. In order to protect the mold, which is in particular produced from cast aluminium, the entire interior mold surface is provided with an epoxy resin coating of several millimeters thickness.

After a wall element is completed in the mold, the cover 1 of the lower part is raised and the finished wall element can be removed, for example by means of suction lifters, from the mold, after the mold parts 2 and 3 are moved apart again. The mold is preferably cleaned by blowing out with compressed air.

It was ascertained that, at a polyurethane foam thickness of 42 mm, it was possible to achieve a coefficient of heat transmission of less than 0.02.

The device according to the invention can preferably be manually operated, but also automatically via a conveyor belt, on a turntable or another automatic system.

Figure 4:
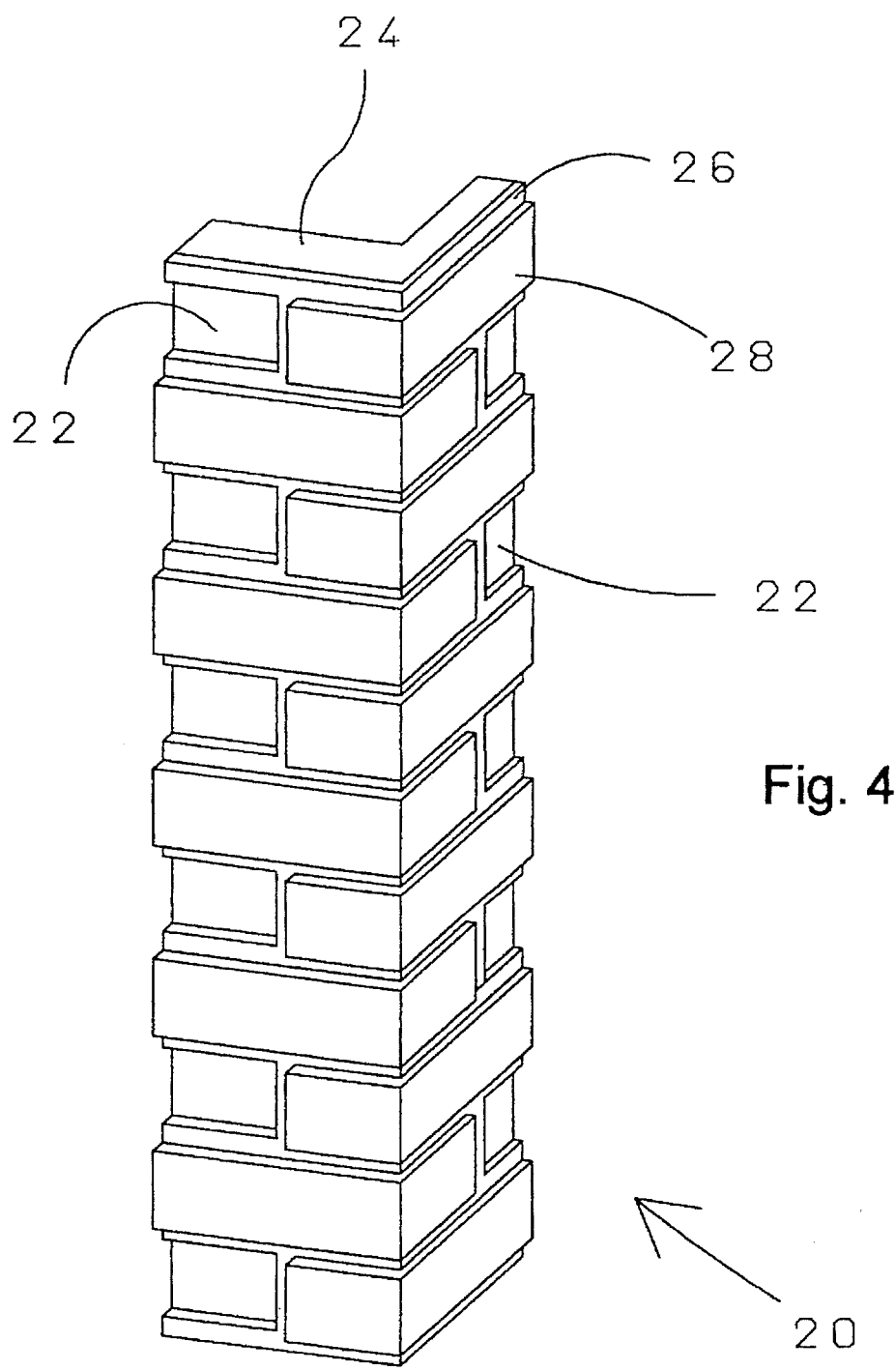
FIG. 4 shows in perspective an angular wall element produced by the mold of FIGS. 1–3.

A finished wall element 20, shown in FIG. 4, is inherently stable and can be readily combined with flat wall elements by inserting into the depressions 22 formed in the corner element by the elevations 9 individual fillets which form a composite with the adjacent panels.

On the reverse side of a finished wall element, a paper layer (not shown) should be present, by means of which the handling is improved and the possibility of leakage of residual blowing agents from the polyurethane foam layer is reduced.

List of References
1 Cover
2 Mould part
3 Mould part
4 Hinge
5 Support block
6 Support block
7 Slide rod
8 Depression
9 Elevation
10 Countermold
11 Surface
12 Web
13 Depression
14 Mould cavity

I claim:

1. A process for producing an angular wall element consisting of an angular rigid foam panel with brick fillets which are bonded thereto and separated from one another by a mortar-like composition, characterized in that angular, one-part fillets are laid adjacent to one another with clearance interspaces between the fillets in a horizontal mold with an essentially V-shaped cross-section, in that the interspaces between the fillets are filled with a mixture of sand and isocyanate and in that, between reverse surfaces of the fillets and the sand and isocyanate mixture and a countermold, a rigid foam layer is introduced, a part of the rigid foam material partly penetrating the sand isocyanate mixture and the regions of the mixture not penetrated by the rigid foam material being removed after curing of the rigid foam material.

2. Process according to claim 1, characterized in that the mixture of sand and isocyanate consists of 30–80 parts by volume of sand and one part by volume of isocyanate and the rigid foam material consists of polyurethane foam.

3. A process according to claim 1, characterized in that the mold is provided with depressions to receive the fillets, and is coated with a release, outside the regions filled with fillets or with the sand and isocyanate mixture, and before the introduction of the rigid foam material.

4. A process according to claim 1, characterized in that the countermold is covered with a paper layer before the introduction of the rigid foam material.

5. A process according to claim 1, characterized in that the molds and materials used are brought to an elevated temperature before processing.

6. Process according to claim 5, characterized in that the elevated temperature is 20°–100° C.

7. An insulating, angular, prefabricated wall element comprising angular brick fillets bonded by means of an angular rigid foam panel and separated from one another by a sand and isocyanate mixture.

8. A wall element according to claim 7, characterized in that the rigid foam panel comprising a rigid foam material that additionally penetrates the sand and isocyanate mixture.

9. Wall element according to claim 7, in which the mixture contains 30–80 parts per volume of sand and one part by volume of isocyanate.

10. Wall element according to claim 7, in which the element is backed with a paper layer.

11. Wall element according to claim 8, in which the mixture contains 30–80 parts per volume of sand and one part volume of isocyanate.

* * * * *

UNITED STATES PATENT AND TRADEMARK OFFICE
CERTIFICATE OF CORRECTION

PATENT NO. : 5,590,499
DATED : January 7, 1997
INVENTOR(S) : Dieter A. Pischel

It is certified that error appears in the above-indentified patent and that said Letters Patent is hereby corrected as shown below:

Column 4, line 21, delete "in that".
Column 4, line 34, insert --agent-- after "release".
Column 4, line 59, insert --by-- after "part".

Signed and Sealed this

Fifth Day of August, 1997

Attest:

BRUCE LEHMAN

Attesting Officer      Commissioner of Patents and Trademarks